(No Model.)

A. E. BATMAN.
COMBINED WHIP AND REIN HOLDER.

No. 318,080. Patented May 19, 1885.

Witnesses.
Thos. H. Hutchins.
Wm. J. Hutchins.

Inventor:
Alfred E. Batman.

UNITED STATES PATENT OFFICE.

ALFRED E. BATMAN, OF JOLIET, ILLINOIS.

COMBINED WHIP AND REIN HOLDER.

SPECIFICATION forming part of Letters Patent No. 318,080, dated May 19, 1885.

Application filed March 12, 1885. (No model.)

*To all whom it may concern:*

Be it known that I, ALFRED E. BATMAN, a citizen of the Dominion of Canada, residing at Joliet, in the county of Will and State of Illinois, have invented certain new and useful Improvements in Combined Whip and Rein Holders, of which the following is a specification, reference being had therein to the accompanying drawings.

Figure 1:
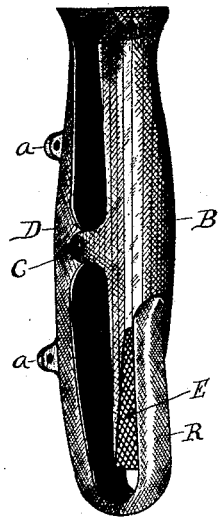
Figure 2:
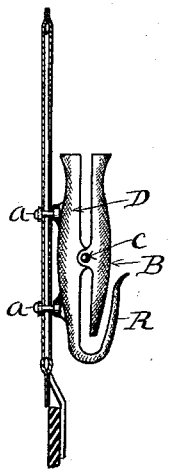

Figure 1 is a perspective of the whip and rein holder detached from the dash of the vehicle. Fig. 2 is a side view of the same as it would appear attached to the dash of the vehicle, and Fig. 3 is a front view of the same as it would appear attached to the dash of the vehicle and in the act of holding the whip and rein.

This invention relates to certain improvements in a whip and rein holder combined, and relates more particularly to that part for holding the rein, which improvements are fully set forth and explained in the following specification and claims.

Referring to the drawings, the whip-holder consists of the two halves or parts B and D, hinged together at about their center, as shown in Figs. 1 and 2. The part D is provided with lugs *a a*, for attaching it to the dash of a carriage, and terminates at its lower end in the horn R, curved to turn upward, so as to inclose the lower end of the opposite part, B, of the holder, as shown particularly in said figures. This horn is intended to stand out far enough from part B, so that when the whip is out there will be an open space between it and said part, so the rein S can be placed between said parts, as shown in Figs. 2 and 3.

Figure 3:
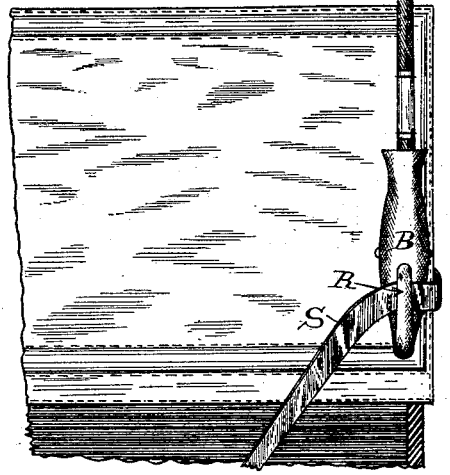

When the whip-handle is placed within the holder between the parts B and D, it will press the lower end of part B outward toward horn R, and thereby clamp the rein S between the horn R and part B and hold it firmly, as is shown in Fig. 3, thus rendering it quite impossible for the rein to be removed or drop out, as it is held rigidly, and not by means of any spring-pressure, as is common in other devices for this purpose.

The meeting faces of the horn R and holder are serrated or roughened, as shown at E, Fig. 1, so as to better hold the rein. Any desired amount of pressure can be brought to bear upon the rein by downward pressure of the whip, which pressure can be immediately released by means of withdrawing the whip from between the parts B and D. The rein cannot be easily removed so long as the whip stands in the holder. By this construction all springs or extra attachments to hold the rein are dispensed with. The whole device is constructed in only two parts, thus forming a cheap, durable, and most effective device for the purpose.

I am aware it is not new to construct a whip-socket of two concave parts hinged together at about their center; but I am not aware that one of its two parts has been formed to terminate at its lower end in a horn bent to turn upward and inclose the lower end of the other part, as is shown in this case.

Having thus described my invention, what I claim as new, and desire to secure by Letters Patent, is as follows, to wit:

1. The combined whip and rein holder, constructed substantially as shown and described, consisting of the stationary concaved part D, having its lower end terminating in the integral upturned hook R, in combination with the concave part B, pivotally attached thereto at or near its center, and having its lower end inclosed by said hook R, substantially as and for the purpose set forth.

2. In the combined whip and rein holder shown and described, the combination of the front pivoted part, B, with the rear stationary part, D, having the horn or hooked part R integral therewith, and formed to extend upward and inclose the lower end of said front pivoted part, and arranged to clamp the reins S by means of a whip-handle inserted between said parts B and D, in the manner set forth.

ALFRED E. BATMAN.

Witnesses:
WM. J. HUTCHINS,
A. S. FELT.